(12) United States Patent
Fattal

(10) Patent No.: US 12,216,296 B2
(45) Date of Patent: Feb. 4, 2025

(54) MULTIVIEW DISPLAY AND METHOD WITH DYNAMICALLY RECONFIGURABLE MULTIVIEW PIXELS

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 1068 days.

(21) Appl. No.: 17/128,099

(22) Filed: Dec. 19, 2020

(65) Prior Publication Data

US 2021/0149213 A1   May 20, 2021

Related U.S. Application Data

(63) Continuation of application No. PCT/US2018/040420, filed on Jun. 29, 2018.

(51) Int. Cl.
 *G02B 30/33* (2020.01)
 *F21V 8/00* (2006.01)
 (Continued)

(52) U.S. Cl.
 CPC ............ *G02B 30/33* (2020.01); *G02B 6/0038* (2013.01); *G02F 1/1323* (2013.01); *G02F 1/13306* (2013.01)

(58) Field of Classification Search
 CPC ..... G02B 30/33; G02B 6/0038; G02F 1/1323; G02F 1/13306; G02F 1/133601;
 (Continued)

(56) References Cited

U.S. PATENT DOCUMENTS

| 4,829,365 A | * | 5/1989 | Eichenlaub ....... G02F 1/133602 |
| | | | 348/E13.058 |
| 9,063,382 B2 | | 6/2015 | Kim |

(Continued)

FOREIGN PATENT DOCUMENTS

| CA | 3101585 | 1/2020 |
| EP | 3814833 | 5/2021 |

(Continued)

OTHER PUBLICATIONS

International Search Report and Written Opinion (ISRWO), 16 pages, from KIPO (ISA/KR), dated Mar. 29, 2019, for counterpart parent PCT patent application No. PCT/US2018/040420.

(Continued)

*Primary Examiner* — Balram T Parbadia
(74) *Attorney, Agent, or Firm* — Schwegman Lundberg & Woessner, P.A.

(57) ABSTRACT

A multiview display employs an array of multibeam elements configured to provide directional light beams having different principal angular directions corresponding to different view directions of the multiview display. Moreover, the multiview display includes an array of light valves configured to modulate the directional light beams as a multiview image to be displayed by the multiview display, where a multiview pixel of the multiview display includes a set of light valves of the light valve array corresponding to a multibeam element of the multibeam element plurality and being configured to modulate directional light beams from the multibeam element. Furthermore, a shape of the multiview pixel is dynamically reconfigurable to provide the multiview image having a dynamic field of view (FOV). The FOV may be modified based on a monitored orientation of the multiview display, a monitored position of a user relative to the multiview display, or both.

18 Claims, 12 Drawing Sheets

(51) Int. Cl.
*G02F 1/13* (2006.01)
*G02F 1/133* (2006.01)

(58) Field of Classification Search
CPC ......... G02F 1/133626; G02F 1/133606; G02F 1/1333; G02F 1/13; G02F 1/133; H04N 13/32; H04N 13/351; H04N 13/366; F21V 8/00
See application file for complete search history.

(56) References Cited

U.S. PATENT DOCUMENTS

| | | | |
|---|---|---|---|
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 10,551,546 B2 | 2/2020 | Fattal | |
| 10,649,128 B2 | 5/2020 | Fattal et al. | |
| 10,798,371 B2 | 10/2020 | Fattal | |
| 2002/0008674 A1 | 1/2002 | Son et al. | |
| 2002/0141056 A1 | 10/2002 | Kobayashi | |
| 2003/0058209 A1 | 3/2003 | Balogh | |
| 2007/0120763 A1 | 5/2007 | De Paepe et al. | |
| 2008/0150936 A1 | 6/2008 | Karman | |
| 2011/0122467 A1* | 5/2011 | Futterer | G03H 1/02 359/9 |
| 2011/0285700 A1* | 11/2011 | Kim | H04N 13/376 345/419 |
| 2012/0038986 A1 | 2/2012 | Pesach | |
| 2012/0212486 A1* | 8/2012 | Van Der Horst | H04N 5/268 345/419 |
| 2012/0242723 A1* | 9/2012 | Miyake | G09G 5/02 345/694 |
| 2013/0169694 A1 | 7/2013 | Chen et al. | |
| 2014/0300840 A1* | 10/2014 | Fattal | G02B 6/0011 349/61 |
| 2015/0015681 A1* | 1/2015 | Kim | G02B 30/27 348/51 |
| 2015/0016777 A1 | 1/2015 | Abovitz et al. | |
| 2017/0070728 A1 | 3/2017 | Kim et al. | |
| 2017/0090096 A1* | 3/2017 | Fattal | G02B 6/002 |
| 2017/0363794 A1* | 12/2017 | Wan | G02B 30/33 |
| 2018/0011237 A1 | 1/2018 | Fattal | |
| 2018/0188691 A1 | 7/2018 | Fattal | |
| 2018/0196194 A1 | 7/2018 | Fattal | |
| 2019/0079306 A1* | 3/2019 | Wang | H04N 13/31 |
| 2019/0155105 A1 | 5/2019 | Aieta et al. | |

FOREIGN PATENT DOCUMENTS

| | | |
|---|---|---|
| JP | 2010243941 A | 10/2010 |
| WO | 2017041079 A1 | 3/2017 |
| WO | WO-2017041072 A1 | 3/2017 |
| WO | 2017204840 A1 | 11/2017 |
| WO | 2017213676 A1 | 12/2017 |
| WO | WO-2020005291 A1 | 1/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
"European Application Serial No. 18923936.1, Communication Pursuant to Article 94(3) EPC mailed Feb. 12, 2024", 5 pgs.
"European Application Serial No. 18923936.1, Communication Pursuant to Article 94(3) EPC mailed Mar. 28, 2023", 6 pgs.
"European Application Serial No. 18923936.1, Extended European Search Report mailed Dec. 1, 2021", 8 pgs.
"International Application Serial No. PCT/US2018/040420, International Preliminary Report on Patentability mailed Jan. 7, 2021", 12 pgs.
"Canadian Application Serial No. 3,101,585, Voluntary Amendment filed Nov. 25, 2020", 38 pgs.
"Canadian Application Serial No. 3,101,585, Office Action mailed Nov. 17, 2021", 3 pgs.
"Canadian Application Serial No. 3,101,585, Response filed Feb. 28, 2022 to Office Action mailed Nov. 17, 2021", 45 pgs.
"European Application Serial No. 18923936.1, Response to Communication pursuant to Rules 161(2) and 162 EPC filed Jul. 26, 2021", 11 pgs.
"European Application Serial No. 18923936.1, Response filed Jun. 7, 2022 to Extended European Search Report mailed Dec. 1, 2021", 15 pgs.
"European Application Serial No. 18923936.1, Response filed Aug. 3, 2023 to Communication Pursuant to Article 94(3) EPC mailed Mar. 28, 2023", 11 pgs.
"European Application Serial No. 18923936.1, Response filed Feb. 19, 2024 to Communication Pursuant to Article 94(3) EPC mailed Feb. 12, 2024", 9 pgs.
"European Application Serial No. 18923936.1, Intention to Grant mailed Jul. 1, 2024", 6 pgs.

* cited by examiner description taken in conjunction with the accompanying drawings, where like reference numerals designate like structural elements, and in which:

MULTIVIEW DISPLAY AND METHOD WITH DYNAMICALLY RECONFIGURABLE MULTIVIEW PIXELS

CROSS-REFERENCE TO RELATED APPLICATIONS

This application is a continuation application of and claims the benefit of priority to International Application No. PCT/US2018/040420, filed Jun. 29, 2018, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview or three-dimensional (3D) display that employs dynamically reconfigurable multiview pixels. In particular, embodiments consistent with the principles described herein provide a multiview display employing an array of multibeam elements configured to provide directional light beams having different principal angular directions corresponding to different view directions of the multiview display. According to various embodiments, the multibeam elements each comprise one or more of a diffraction grating, a micro-reflective element, and a micro-refractive element. Moreover, according to various embodiments, the multiview display includes an array of light valves configured to modulate the directional light beams as a multiview image to be displayed by the multiview display, where a multiview pixel of the multiview display includes a set of light valves of the light valve array corresponding to a multibeam element of the multibeam element plurality and being configured to modulate directional light beams from the multibeam element. Further, according to various embodiments, a shape of the multiview pixel is dynamically reconfigurable to provide the multiview image having a dynamic field of view (FOV). For example, the FOV may be modified based on a monitored orientation of the multiview display, a monitored position of a user relative to the multiview display, or both.

Figure 1A:
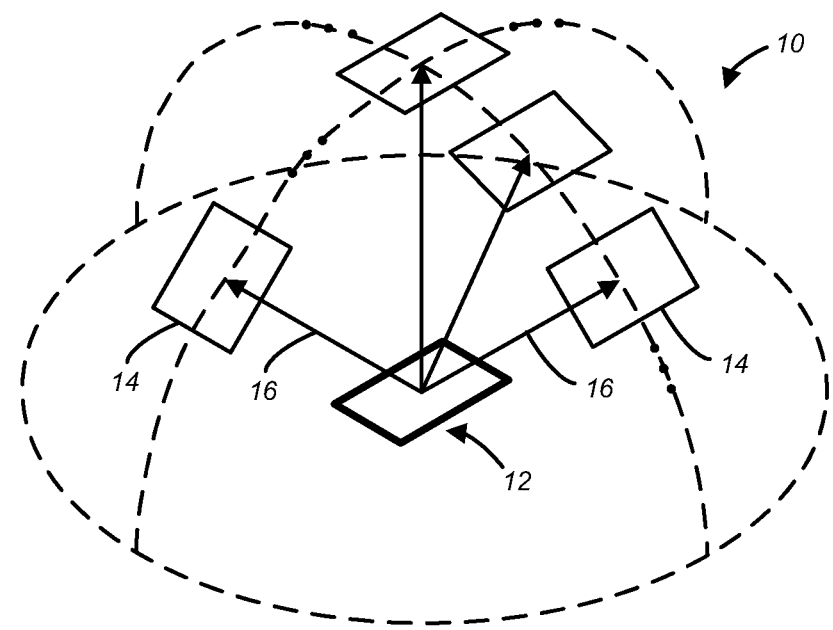
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
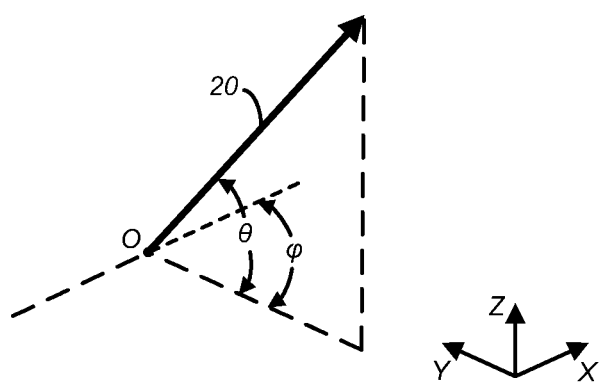
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set or group of sub-pixels (such as light valves) representing 'view' pixels in each view of a plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of different views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

In the discussion that follows, a shape of a multiview pixel may be dynamically reconfigured, e.g., based on one or more of a monitored orientation of the multiview display, a monitored position of a user relative to the multiview display, and content displayed on the multiview display. Consequently, a multiview pixel may have an arbitrary shape that can be implemented on a discrete array of light valves (e.g., an arbitrary step-wise shape).

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a diffractive multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, . . . ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2:
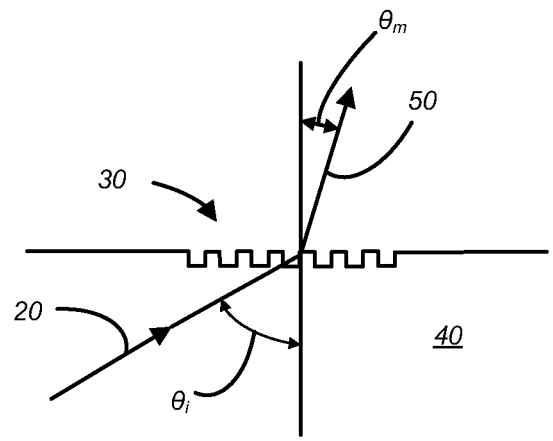
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided light beam within the light guide 40. Also illustrated in FIG. 2 is a directional light beam 50 diffractively produced and coupled-out or scattered-out by the diffraction grating 30 as a result of diffraction of the incident light beam 20. The directional light beam 50 has a diffraction angle $\theta_m$ (or 'principal angular direction' herein) as given by equation (1). The directional light beam 50 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light scattered-out by the diffraction grating, for example. For example, a principal angular direction of the directional light may be a function of an angle of the diffractive feature at a point at which the light is incident on the diffraction grating relative to a propagation direction of the incident light.

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively coupling out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. According to various embodiments, the spacing or grating pitch of diffractive features in the diffraction gratings of the diffractive multibeam element may be sub-wavelength (i.e., less than a wavelength of the guided light).

While a multibeam element with a plurality of diffraction gratings is used as an illustrative example in the discussion that follows, in some embodiments other components may be used in multibeam element, such as at least one of a micro-reflective element and a micro-refractive element. For example, the micro-reflective element may include a triangular-shaped mirror, a trapezoid-shaped mirror, a pyramid-shaped mirror, a rectangular-shaped mirror, a hemispherical-shaped mirror, a concave mirror and/or a convex mirror. In some embodiments, a micro-refractive element may include a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams in the light beam plurality are determined by a characteristic including, but not limited to, a size (e.g., one or more of length, width, area, and etc.) of the diffractive multibeam element along with a 'grating pitch' or a diffractive feature spacing and an orientation of a diffraction grating within diffractive multibeam element. In some embodiments, the diffractive multibeam element may be considered an 'extended point light source', i.e., a plurality of point light sources distributed across an extent of the diffractive multibeam element, by definition herein. Further, a light beam produced by the diffractive multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, or various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor,' denoted σ, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
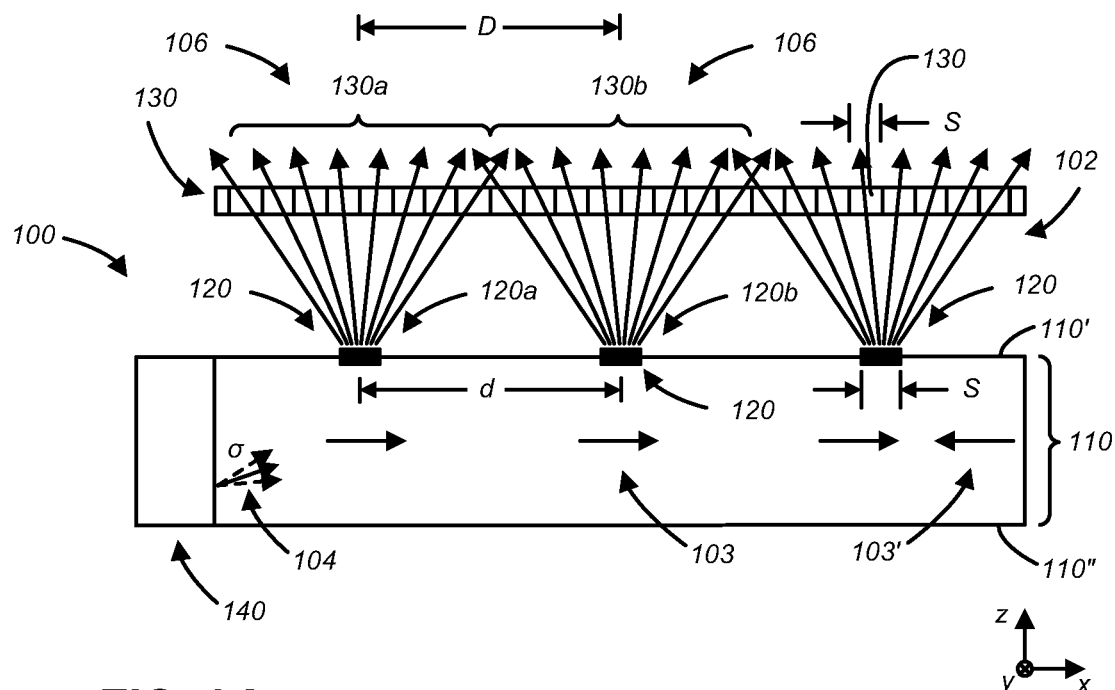
FIG. 3A illustrates a cross-sectional view of a multiview display in an example, according to an embodiment consistent with the principles described herein.
Figure 3B:
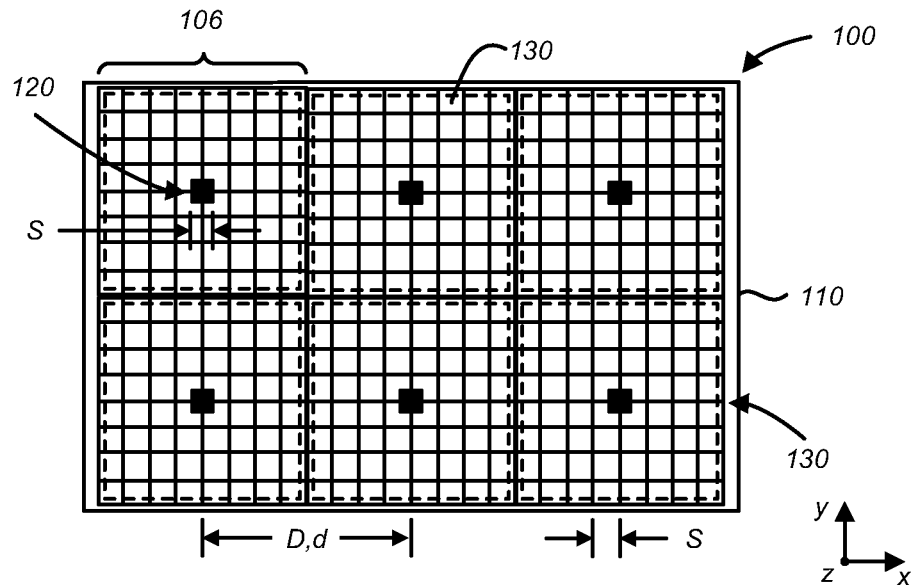
FIG. 3B illustrates a plan view of a multiview display in an example, according to an embodiment consistent with the principles described herein.
Figure 3C:
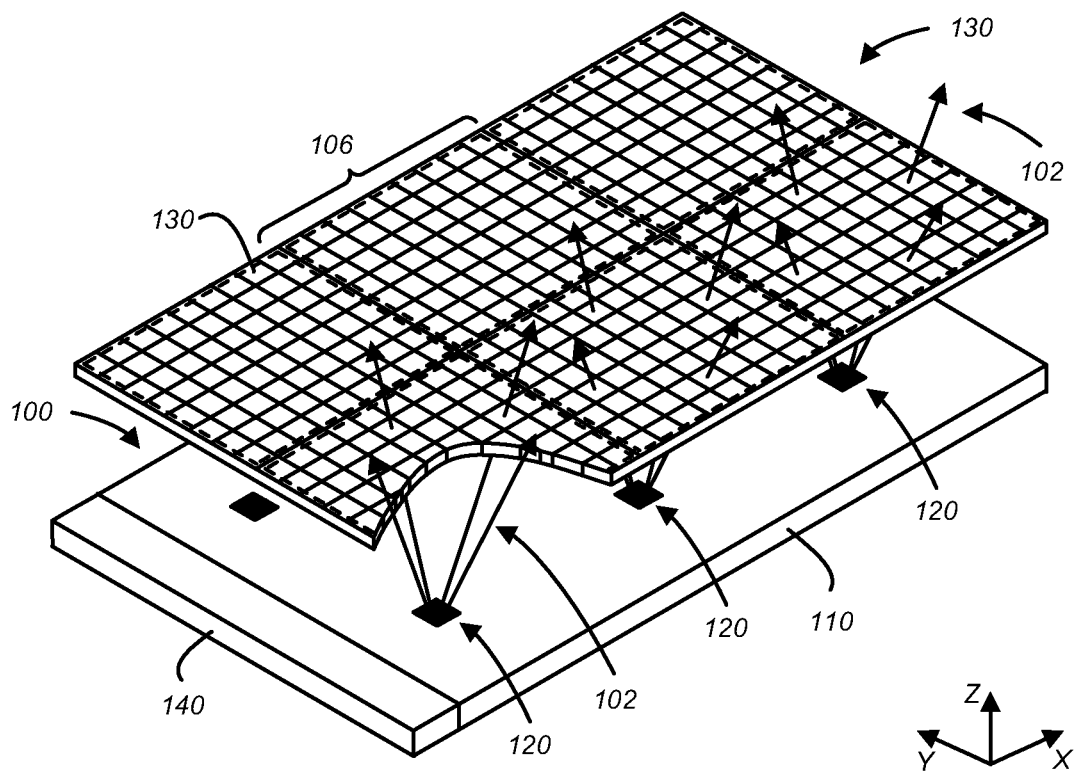
FIG. 3C illustrates a perspective view of a multiview display in an example, according to an embodiment consistent with the principles described herein.

According to some embodiments of the principles described herein, a multiview display is provided. FIG. 3A illustrates a cross-sectional view of a multiview display 100 in an example, according to an embodiment consistent with the principles described herein. FIG. 3B illustrates a plan view of a multiview display 100 in an example, according to an embodiment consistent with the principles described herein. FIG. 3C illustrates a perspective view of a multiview display 100 in an example, according to an embodiment consistent with the principles described herein. The perspective view in FIG. 3C is illustrated with a partial cut-away to facilitate discussion herein only.

The multiview display 100 illustrated in FIGS. 3A-3C is configured to provide a plurality of directional light beams 102 having different principal angular directions from one another (e.g., as a light field). In particular, the provided plurality of directional light beams 102 are scattered out and directed away from the multiview display 100 in different principal angular directions corresponding to respective view directions of a multiview display, according to various embodiments. In some embodiments, the directional light beams 102 may be modulated (e.g., using light valves, as described below) to facilitate the display of information having multiview content, e.g., a multiview image. FIGS. 3A-3C also illustrate a multiview pixel 106 comprising sub-pixels and an array of light valves 130, which are described in further detail below. Note that the sub-pixels of the multiview pixel 106 are equivalent to light valves 130 of the light valve array, as illustrated.

As illustrated in FIGS. 3A-3C, the multiview display 100 comprises a light guide 110. The light guide 110 is configured to guide light along a length of the light guide 110 as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light beam 104 according to total internal reflection at a non-zero propagation angle between a first surface 110' (e.g., 'front' surface or side) and a second surface 110" (e.g., 'back' surface or side) of the light guide 110. In particular, the guided light beam 104 propagates by reflecting or 'bouncing' between the first surface 110' and the second surface 110" of the light guide 110 at the non-zero propagation angle. In some embodiments, a plurality of guided light beams 104 comprising different colors of light may be guided by the light guide 110 at respective ones of different color-specific, non-zero propagation angles. Note that the non-zero propagation angle is not illustrated in FIGS. 3A-3C for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

The guided light beam 104 in the light guide 110 may be introduced or coupled into the light guide 110 at the non-zero propagation angle (e.g., about 30-35 degrees). In some examples, a coupling structure such as, but not limited to, a lens, a mirror or similar reflector (e.g., a tilted collimating reflector), a diffraction grating and a prism (not illustrated) as well as various combinations thereof may facilitate coupling light into an input end of the light guide 110 as the guided light beam 104 at the non-zero propagation angle. In other examples, light may be introduced directly into the input end of the light guide 110 either without or substantially without the use of a coupling structure (i.e., direct or 'butt' coupling may be employed). Once coupled into the light guide 110, the guided light beam 104 is configured to propagate along the light guide 110 in a propagation direction 103 that may be generally away from the input end (e.g., illustrated by bold arrows pointing along an x-axis in FIG. 3A).

Further, the guided light 104, or equivalently the guided light beam 104, produced by coupling light into the light guide 110 may be a collimated light beam, according to various embodiments. Herein, a 'collimated light' or a 'collimated light beam' is generally defined as a beam of light in which rays of the light beam are substantially parallel to one another within the light beam (e.g., the guided light beam 104). Also by definition herein, rays of light that diverge or are scattered from the collimated light beam are not considered to be part of the collimated light beam. In some embodiments (not illustrated), the multiview display 100 may include a collimator, such as a lens, reflector or mirror, as described above, (e.g., tilted collimating reflector) to collimate the light, e.g., from a light source. In some embodiments, the light source itself comprises a collimator. The collimated light provided to the light guide 110 is a collimated guided light beam 104. The guided light beam 104 may be collimated according to or having a collimation factor σ, in various embodiments. Alternatively, the guided light beam 104 may be uncollimated, in other embodiments.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. In some embodiments, another light source may provide guided light 104 in the other propagation direction 103' instead of or in addition to light recycling (e.g., using a reflector). One or both of recycling the guided light 104 and using another light source to provide guided light 104 having the other propagation direction 103' may increase a brightness of the multiview display 100 (e.g., increase an intensity of the directional light beams 102) by making guided light available more than once, for example, to multibeam elements, described below.

In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103).

As illustrated in FIGS. 3A-3C, the multiview display 100 further comprises a plurality of multibeam elements 120 spaced apart from one another along the light guide length. In particular, the multibeam elements 120 of the plurality are separated from one another by a finite space and represent individual, distinct elements along the light guide length. That is, by definition herein, the multibeam elements 120 of the plurality are spaced apart from one another according to a finite (i.e., non-zero) inter-element distance (e.g., a finite center-to-center distance). Further, the multibeam elements 120 of the plurality generally do not intersect, overlap or otherwise touch one another, according to some embodiments. That is, each multibeam element 120 of the plurality is generally distinct and separated from other ones of the multibeam elements 120.

According to some embodiments, the multibeam elements 120 of the plurality may be arranged in either a one-dimensional (1D) array or a two-dimensional (2D) array. For example, the multibeam elements 120 may be arranged as a linear 1D array. In another example, the multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 120 may be substantially uniform or constant across the array. In other examples, the inter-element distance between the multibeam elements 120 may be varied one or both of across the array and along the length of the light guide 110.

According to various embodiments, a multibeam element 120 of the multibeam element plurality is configured to provide, couple out or scatter out a portion of the guided light 104 as the plurality of directional light beams 102. For example, the guided light portion may be coupled out or scattered out using one or more of diffractive scattering, reflective scattering, and refractive scattering or coupling, according to various embodiments. FIGS. 3A and 3C illustrate the directional light beams 102 as a plurality of diverging arrows depicted as being directed way from the first (or front) surface 110' of the light guide 110. Further, according to various embodiments, a size of the multibeam element 120 is comparable to a size of a sub-pixel (or equivalently a light valve 130) of a multiview pixel 106, as defined above and further described below and illustrated in FIGS. 3A-3C. Herein, the 'size' may be defined in any of a variety of manners to include, but not be limited to, a length, a width or an area. For example, the size of a sub-pixel or a light valve 130 may be a length thereof and the comparable size of the multibeam element 120 may also be a length of the multibeam element 120. In another example, the size may refer to an area such that an area of the multibeam element 120 may be comparable to an area of the sub-pixel (or the light value 130).

In some embodiments, the size of the multibeam element 120 is comparable to the sub-pixel size such that the multibeam element size is between about fifty percent (50%) and about two hundred percent (200%) of the sub-pixel size. For example, if the multibeam element size is denoted 's' and the sub-pixel size is denoted 'S' (e.g., as illustrated in FIG. 3A), then the multibeam element size s may be given by $$\tfrac{1}{2}S \leq s \leq 2S$$

In other examples, the multibeam element size is in a range that is greater than about sixty percent (60%) of the sub-pixel size, or greater than about seventy percent (70%) of the sub-pixel size, or greater than about eighty percent (80%) of the sub-pixel size, or greater than about ninety percent (90%) of the sub-pixel size, and that is less than about one hundred eighty percent (180%) of the sub-pixel size, or less than about one hundred sixty percent (160%) of the sub-pixel size, or less than about one hundred forty (140%) of the sub-pixel size, or less than about one hundred twenty percent (120%) of the sub-pixel size. For example, by 'comparable size', the multibeam element size may be between about seventy-five percent (75%) and about one hundred fifty (150%) of the sub-pixel size. In another example, the multibeam element 120 may be comparable in size to the sub-pixel where the multibeam element size is between about one hundred twenty-five percent (125%) and about eighty-five percent (85%) of the sub-pixel size. According to some embodiments, the comparable sizes of the multibeam element 120 and the sub-pixel may be chosen to reduce, or in some examples to minimize, dark zones between views of the multiview display. Moreover, the comparable sizes of the multibeam element 120 and the sub-pixel may be chosen to reduce, and in some examples to minimize, an overlap between views (or view pixels) of the multiview display.

The multiview display 100 illustrated in FIGS. 3A-3C further comprises the array of light valves 130 configured to modulate the directional light beams 102 of the directional light beam plurality. As illustrated, different ones of the directional light beams 102 having different principal angular directions pass through and may be modulated by different ones of the light valves 130 in the light valve array. Further, as illustrated, a light valve 130 of the array corresponds to a sub-pixel of the multiview pixel 106, and a set of the light valves 130 corresponds to a multiview pixel 106 of the multiview display. In particular, a different set of light valves 130 of the light valve array is configured to receive and modulate the directional light beams 102 from a corresponding one of the multibeam elements 120, i.e., there is one unique set of light valves 130 for each multibeam element 120, as illustrated. In various embodiments, different types of light valves may be employed as the light valves 130 of the light valve array including, but not limited to, one or more of liquid crystal light valves, electrophoretic light valves, and light valves based on electrowetting.

As illustrated in FIG. 3A, a first light valve set 130a is configured to receive and modulate the directional light beams 102 from a first multibeam element 120a. Further, a second light valve set 130b is configured to receive and modulate the directional light beams 102 from a second multibeam element 120b. Thus, each of the light valve sets (e.g., the first and second light valve sets 130a, 130b) in the light valve array corresponds, respectively, both to a different multibeam element 120 (e.g., elements 120a, 120b) and to a different multiview pixel 106, with individual light valves 130 of the light valve sets corresponding to the sub-pixels of the respective multiview pixels 106, as illustrated in FIG. 3A.

Note that, as illustrated in FIG. 3A, the size of a sub-pixel of a multiview pixel 106 may correspond to a size of a light valve 130 in the light valve array. In other examples, the sub-pixel size may be defined as a distance (e.g., a center-to-center distance) between adjacent light valves 130 of the light valve array. For example, the light valves 130 may be smaller than the center-to-center distance between the light valves 130 in the light valve array. The sub-pixel size may be defined as either the size of the light valve 130 or a size corresponding to the center-to-center distance between the light valves 130, for example.

In some embodiments, a relationship between the multibeam elements 120 and corresponding multiview pixels 106 (i.e., sets of sub-pixels and corresponding sets of light valves 130) may be a one-to-one relationship. That is, there may be an equal number of multiview pixels 106 and multibeam elements 120. FIG. 3B explicitly illustrates by way of example the one-to-one relationship where each multiview pixel 106 comprising a different set of light valves 130 (and corresponding sub-pixels) is illustrated as surrounded by a dashed line. In other embodiments (not illustrated), the number of multiview pixels 106 and the number of multibeam elements 120 may differ from one another.

In some embodiments, an inter-element distance (e.g., center-to-center distance) between a pair of multibeam elements 120 of the plurality may be equal to an inter-pixel distance (e.g., a center-to-center distance) between a corresponding pair of multiview pixels 106, e.g., represented by light valve sets. For example, as illustrated in FIG. 3A, a center-to-center distance d between the first multibeam element 120a and the second multibeam element 120b is substantially equal to a center-to-center distance D between the first light valve set 130a and the second light valve set 130b. In other embodiments (not illustrated), the relative center-to-center distances of pairs of multibeam elements 120 and corresponding light valve sets may differ, e.g., the multibeam elements 120 may have an inter-element spacing (i.e., center-to-center distance d) that is one of greater than or less than a spacing (i.e., center-to-center distance D) between light valve sets representing multiview pixels 106.

In some embodiments, a shape of the multibeam element 120 may be analogous to a shape of the multiview pixel 106 or equivalently, to a shape of a set (or 'sub-array') of the light valves 130 corresponding to the multiview pixel 106. For example, the multibeam element 120 may have a square shape and the multiview pixel 106 (or an arrangement of a corresponding set of light valves 130) may be substantially square. In another example, the multibeam element 120 may have a rectangular shape, i.e., may have a length or longitudinal dimension that is greater than a width or transverse dimension. In this example, the multiview pixel 106 (or equivalently the arrangement of the set of light valves 130) corresponding to the multibeam element 120 may have an analogous rectangular shape. FIG. 3B illustrates a top or plan view of square-shaped multibeam elements 120 and corresponding square-shaped multiview pixels 106 comprising square sets of light valves 130. In yet other examples (not illustrated), the multibeam elements 120 and the corresponding multiview pixels 106 have various shapes including or at least approximated by, but not limited to, a triangular shape, a hexagonal shape, and a circular shape. Moreover, as noted previously and described further below, a shape of the multiview pixel 106 (i.e., the set of sub-pixels) may be dynamically reconfigurable to provide a dynamic FOV. Therefore, in these embodiments, there may not, in general, be a relationship between the shape of the multibeam element 120 and the shape of the multiview pixel 106.

Further (e.g., as illustrated in FIG. 3A), each multibeam element 120 is configured to provide directional light beams 102 to one and only one multiview pixel 106 at a given time based on the set of sub-pixels that are currently assigned to a particular multiview pixel 106, according to some embodiments. In particular, for a given one of the multibeam elements 120 and a current assignment of the set of sub-pixels to a particular multiview pixel 106, the directional light beams 102 having different principal angular directions corresponding to the different views of the multiview display are substantially confined to the single corresponding multiview pixel 106 and the sub-pixels thereof, i.e., a single set of light valves 130 corresponding to the multibeam element 120, as illustrated in FIG. 3A. As such, each multibeam element 120 of the multiview display 100 provides a corresponding set of directional light beams 102 that has a set of the different principal angular directions corresponding to the current different views of the multiview display (i.e., the set of directional light beams 102 contains a light beam having a direction corresponding to each of the current different view directions). By dynamically and selectively assigning sets of sub-pixels to multiview pixel 106 and, thus, to particular view directions, the multiview display 100 may dynamically selectively change the FOV. For example, when the multiview display 100 has a landscape orientation, the FOV may be selectively changed to be relatively wider and shorter. Further, when the multiview display 100 has a portrait orientation, the FOV may be selectively changed to be relatively narrower and taller.

According to various embodiments, the multiview display 100 comprises a plurality of multiview pixels 106 having dynamically reconfigurable shapes. In particular, a multiview pixel 106 of the multiview pixel plurality comprises a set of light valves 130 configured to modulate the directional light beams to provide a multiview image. Additionally, the multiview pixels 106 of the multiview pixel plurality have individual shapes that are dynamically reconfigurable to provide the multiview image having a dynamic FOV based on a condition of the multiview display 100, according to various embodiments.

FIGS. 4A-4D illustrates plan views of multiview pixels 106 having dynamically (such as in real-time or 'on the fly') reconfigurable shapes 132 (shown using dashed lines to outline the shapes 132) in examples, according to an embodiment consistent with the principles described herein. In particular, and by way of example and not limitation in FIGS. 4A-4D, each of the multiview pixels 106 modulates scattered light from a multibeam element 120 and provides 32 views. However, the shapes 132 of the sets of light valves 130 and, thus, corresponding FOVs provided by the multiview pixels 106 are different from one another in each of the various multiview pixels 106 illustrated FIGS. 4A-4D. Moreover, the different FOVs may be useful with respect to different orientations or other conditions of the multiview display 100 when in use. For example, the shapes 132 in FIG. 4A (e.g., having a width 134 that is greater than a length 136) may be used when the multiview display has a landscape orientation or being used in landscape mode. In particular, this configuration of the multiview pixels 106 may provide a wider FOV along an x-axis (such as horizontal or longitudinal direction) than along a y-axis (such as a vertical direction). Further, this wider FOV may include more views or view directions in or along a direction corresponding to the x-axis, i.e., as a viewer rotates their gaze about the y-axis. Alternatively, the shapes 132 in FIG. 4B (with a width 134 that is less a length 136) may be used when the multiview display has a portrait orientation or being used in portrait mode. This configuration of the multiview pixels 106 may provide a wider FOV along the y-axis than along the x-axis. As before, the wider FOV may include more views or view directions, but in this instance in or along the y-axis, i.e., as a viewer rotates their gaze about the x-axis. Moreover, multiview display may be configured to switch between the shapes 132 in each of FIGS. 4A and 4B during operation to provide dynamic reconfiguration of both the shapes 132 and the FOVs, according to some embodiments.

Figure 4A:
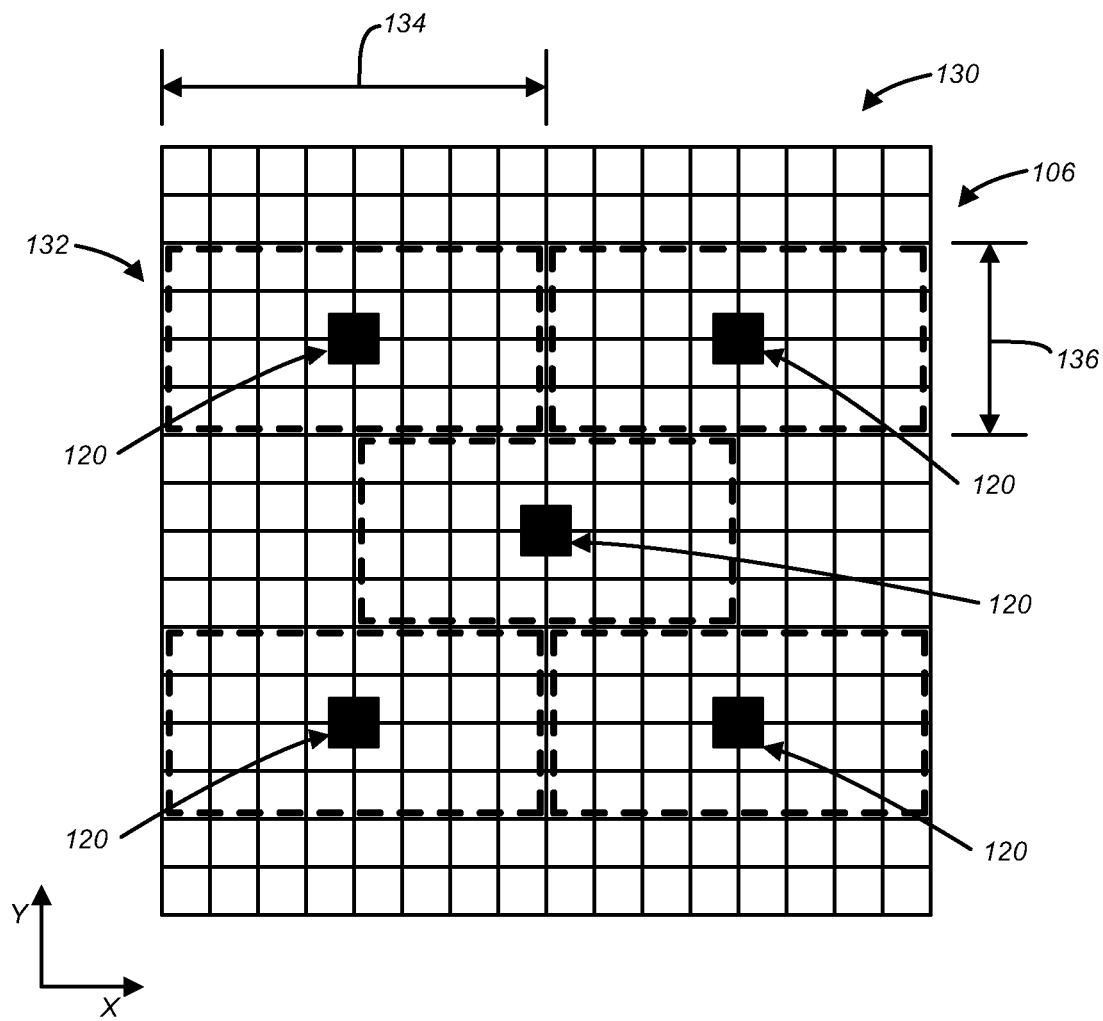
FIG. 4A illustrates a plan view of a multiview pixel having a dynamically reconfigurable shape in an example, according to an embodiment consistent with the principles described herein.
Figure 4B:
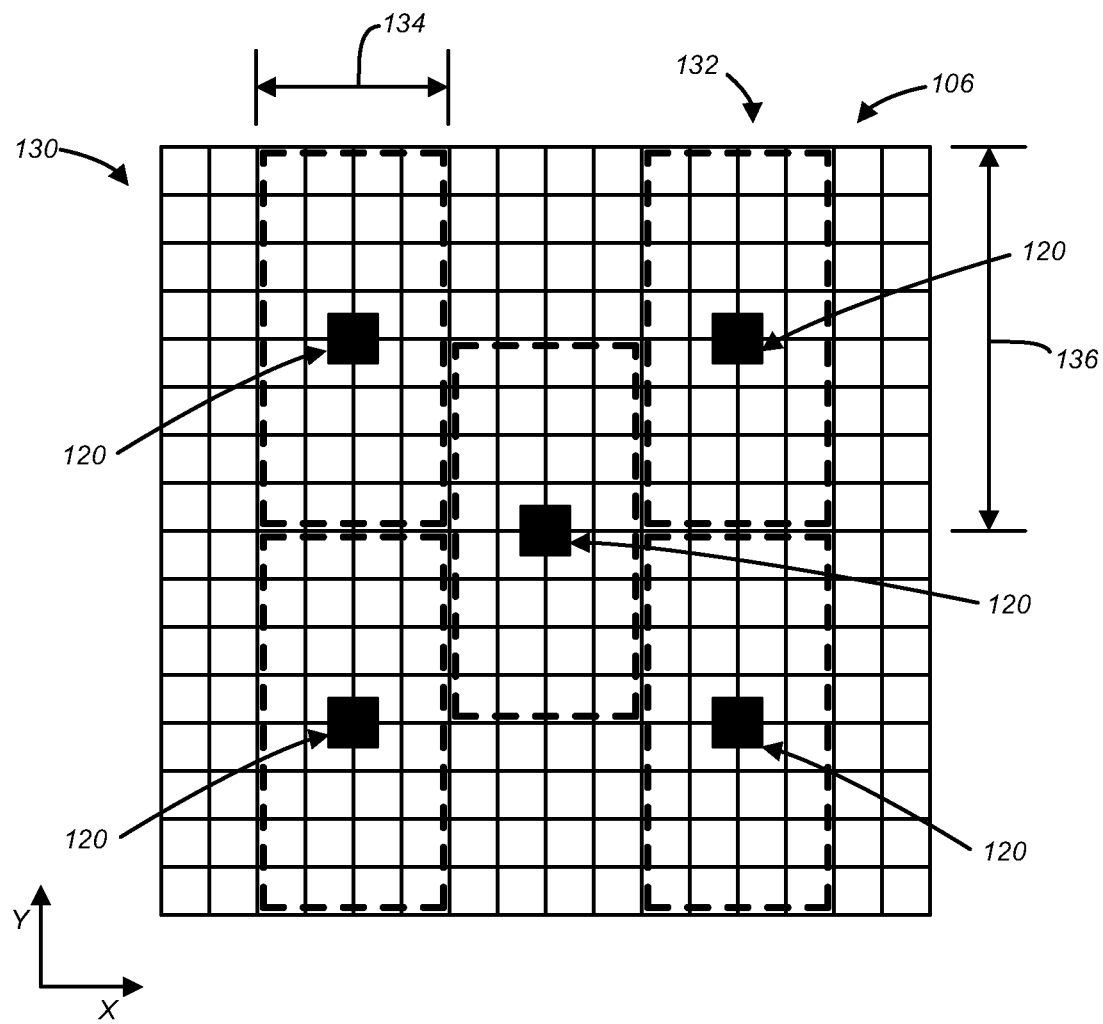
FIG. 4B illustrates a plan view of a multiview pixel having a dynamically reconfigurable shape in another example, according to an embodiment consistent with the principles described herein.
Figure 4C:
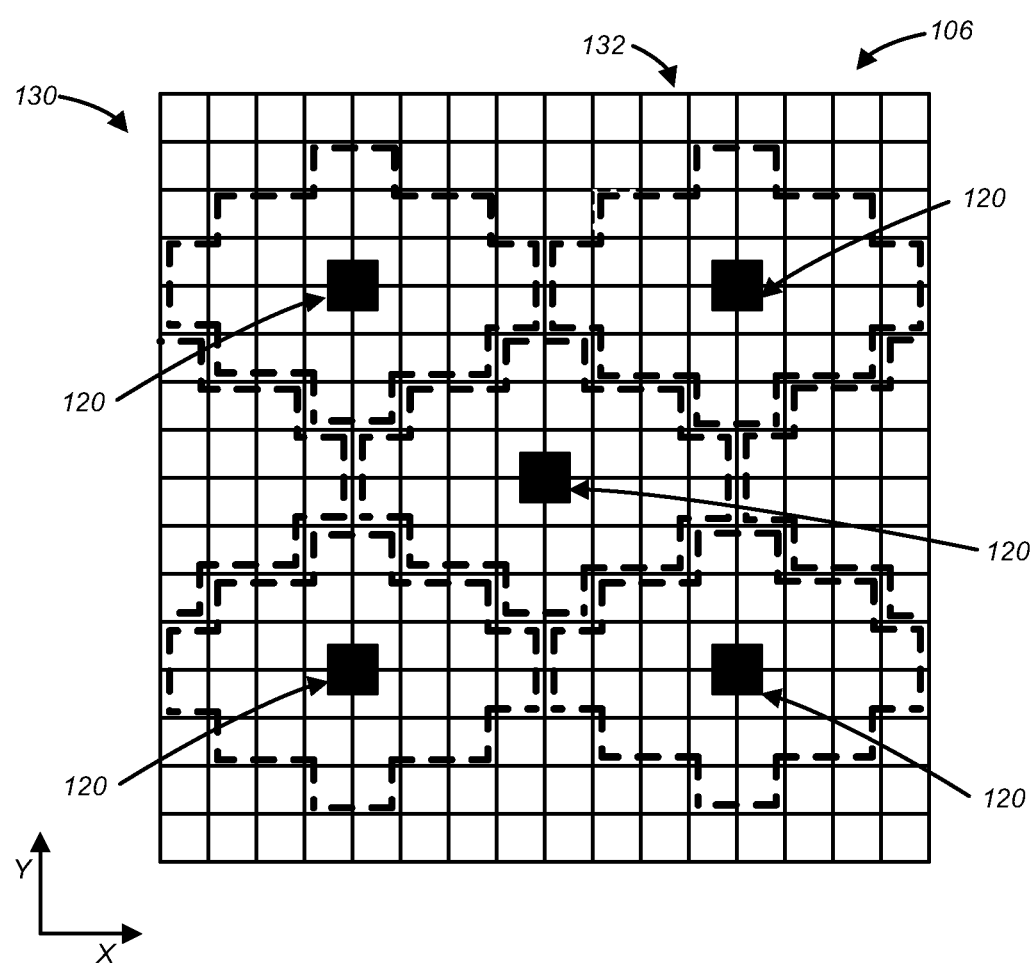
FIG. 4C illustrates a plan view of a multiview pixel having a dynamically reconfigurable shape in another example, according to an embodiment consistent with the principles described herein.
Figure 4D:
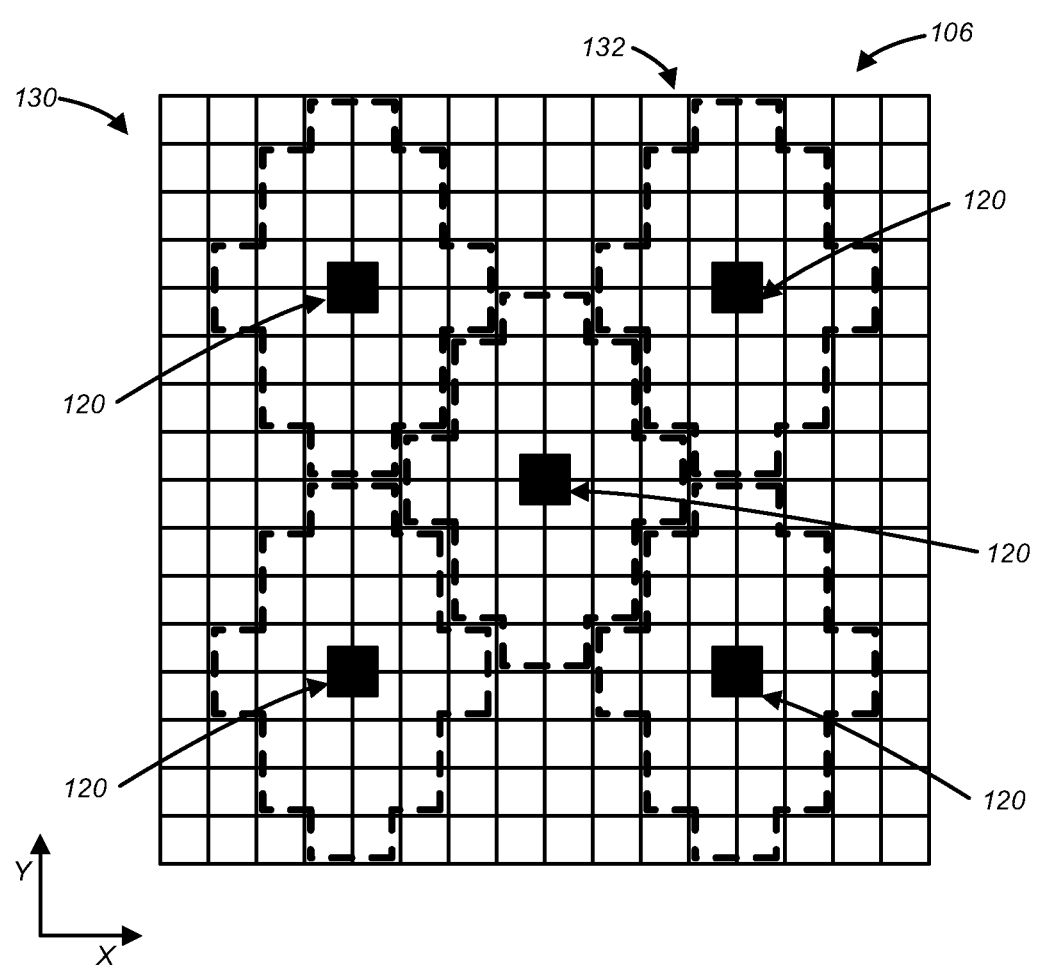
FIG. 4D illustrates a plan view of a multiview pixel having a dynamically reconfigurable shape in another example, according to an embodiment consistent with the principles described herein.

In general, instead of rectangular shapes 132, the multiview pixels 106 may have an arbitrary step-wise shape or equivalently a tileable shape. This is shown in FIGS. 4C and 4D by way of example and not limitation. In particular FIGS. 4C and 4D illustrate plan views of multiview pixels 106 having dynamically reconfigurable shapes 132 in examples, according to an embodiment consistent with the principles described herein.

Figure 5A:
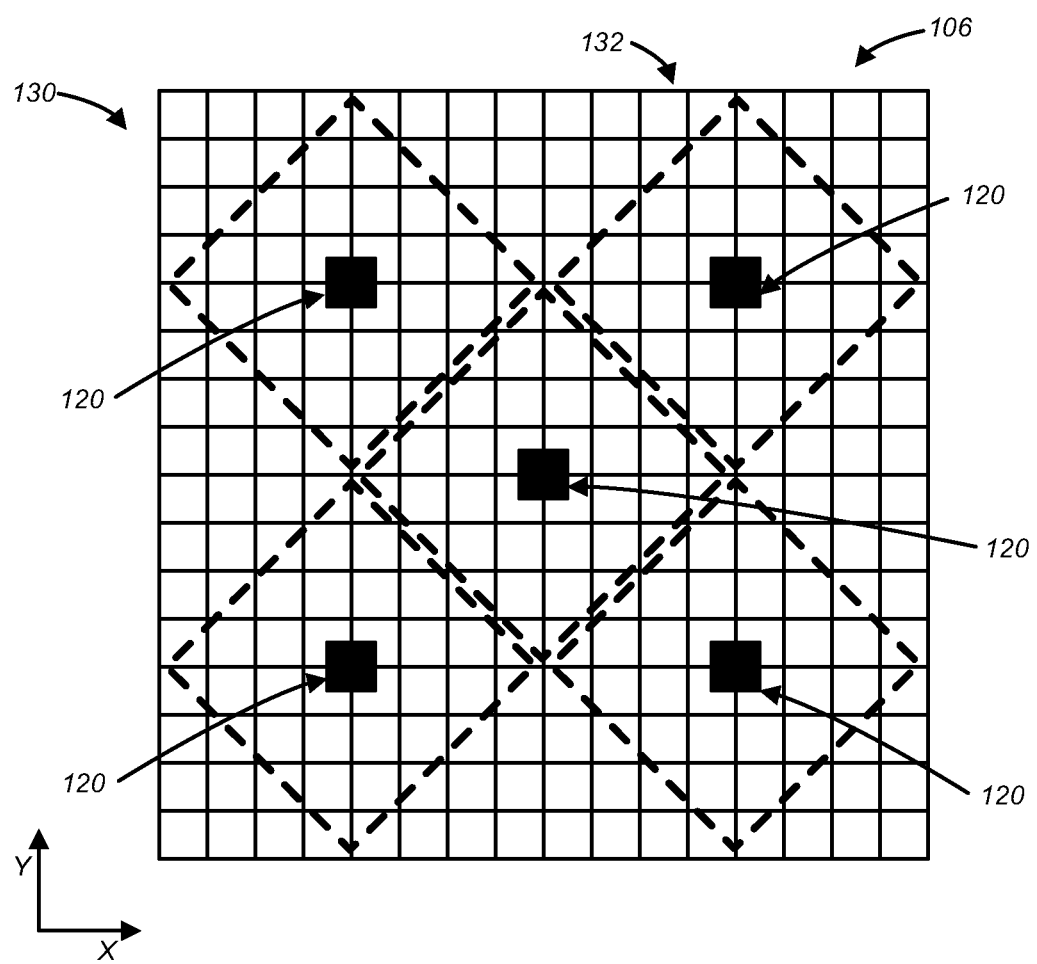
FIG. 5A illustrates a plan view of a multiview pixel having a dynamically reconfigurable shape in an example, according to an embodiment consistent with the principles described herein.
Figure 5B:
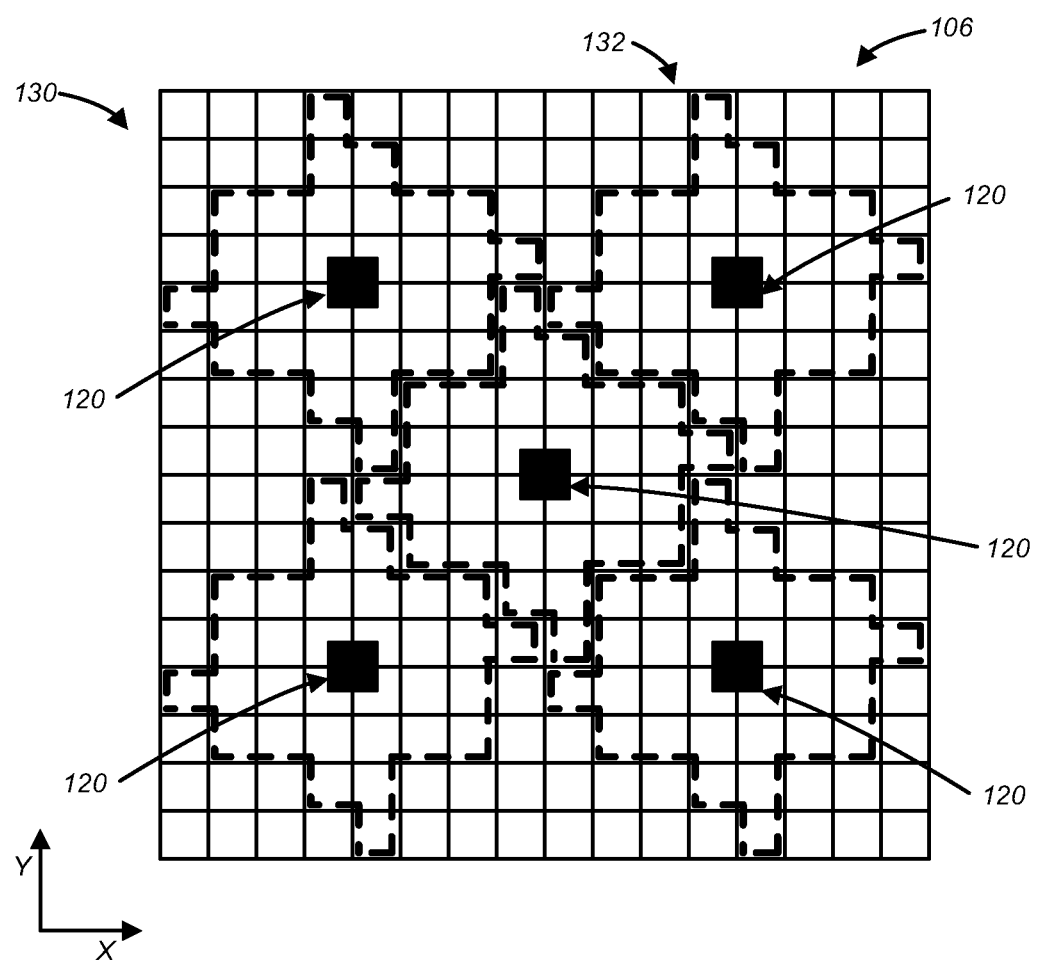
FIG. 5B illustrates a plan view of a multiview pixel having a dynamically reconfigurable shape in another example, according to an embodiment consistent with the principles described herein.

In some embodiments, the shapes 132 of the multiview pixels 106 may be used to provide a balanced or similar FOVs for different views along each of the x-axis and the y-axis, e.g., such as when the multiview display 100 is in a landscape orientation or a portrait orientation. FIG. 5A illustrates a plan view of multiview pixels 106 having dynamically reconfigurable shapes 132 (shown using dashed lines, as above) in an example, according to another embodiment consistent with the principles described herein. In particular, the multiview pixels 106 illustrated in FIG. 5A have a symmetric diamond shape 132. Note that the symmetric diamond shapes 132 of the multiview pixels 106 illustrated in FIG. 5A may be achieved by grayscale or duty-cycle modulation of at least some of the light valves 130 in a multiview display. Thus, by dynamically reassigning or reconfiguring the sub-pixels in the multiview pixels 106, different shapes 132 and, therefore, different FOVs may be obtained. Alternatively, the symmetric diamond shape 132 may be implemented using a tileable approximation. FIG. 5B illustrates a plan view of multiview pixels 106 having dynamically reconfigurable shapes 132 implemented as an approximation in an example, according to an embodiment consistent with the principles described herein. As illustrated the approximation or equivalently step-wise shapes 132 may provide a practical implementation of the symmetric diamond shapes 132 illustrated in FIG. 5A.

As mentioned above and shown in FIGS. 4A-5B, the shapes 132 of the multiview pixels 106 may be tileable in a plane of the multiview display, i.e., multiview pixels 106 may be positioned next to each other without space between adjacent multiview pixels 106. While specific shapes 132 are illustrated in FIGS. 4A-5B, shapes 132 may include: a diamond, a square, a horizontal rectangle, a vertical rectangle, or a step-wise shape.

According to various embodiments, the dynamic adaptation or reconfiguration of the multiview pixels 106, and thus of the FOV, may be based on a condition of the multiview display 100. The condition may, at least in part, include one or more of a position of a user or viewer relative to the multiview display 100, a gaze direction of the user, or head tracking of a head of a user. For example, a multiview display 100 or an electronic device that includes a multiview display 100 may track or monitor a location of a user relative to the multiview display 100. In some embodiments, the tracking involves analysis of one or more images. Alternatively or additionally, the monitoring may be performing using ultrasound, wireless signals or another type of metrology.

Moreover, in some embodiments, the dynamic adaptation or reconfiguration of the multiview pixels 106, and thus of the FOV, may be based on, at least in part, on a condition including a monitored orientation of a multiview display. For example, the orientation may be determined using one or more of a gyroscope, an accelerometer, and another type of orientation measurement (such as analysis of an image acquired using a camera or an image sensor). Thus, the dynamic FOV may be reconfigured based at least in part on measurements performed using at least a sensor that is included in the multiview display 100 or an electronic device that includes the multiview display 100.

Further, in some embodiments the dynamic adaptation or reconfiguration of the multiview pixels 106, and thus of the FOV, may be based on, at least in part, a condition including a content of a multiview image that is to be presented on a multiview display 100. For example, if the content includes a panoramic scene having a wide width or axis, the dynamic FOV may be reconfigured to provide a larger number of views along the width or axis. More generally, the content may be analyzed to determine an information spatial density along one or more different axes (such as a length and a width), and the dynamic FOV may be reconfigured to provide a larger number of views along an axis with the highest information spatial density.

Referring again to FIG. 3A, the multiview display 100 may further comprise a light source 140. According to various embodiments, the light source 140 is configured to provide the light to be guided within light guide 110. In particular, the light source 140 may be located adjacent to an entrance surface or end (input end) of the light guide 110. In various embodiments, the light source 140 may comprise substantially any source of light (e.g., optical emitter) including, but not limited to, an LED, a laser (e.g., laser diode) or a combination thereof. In some embodiments, the light source 140 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 140 may be a substantially broadband light source configured to provide substantially broadband or polychromatic light. For example, the light source 140 may provide white light. In some embodiments, the light source 140 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 140 may further comprise a collimator. The collimator may be configured to receive substantially uncollimated light from one or more of the optical emitters of the light source 140. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

In some embodiments, the multiview display 100 is configured to be substantially transparent to light in a direction through the light guide 110 orthogonal to (or substantially orthogonal) to a propagation direction 103, 103' of the guided light 104. In particular, the light guide 110 and the spaced apart multibeam elements 120 allow light to pass through the light guide 110 through both the first surface 110' and the second surface 110", in some embodiments. Transparency may be facilitated, at least in part, due to both the relatively small size of the multibeam elements 120 and the relative large inter-element spacing (e.g., one-to-one correspondence with the multiview pixels 106) of the multibeam element 120. Further, the diffraction gratings 122 of the multibeam elements 120 may also be substantially transparent to light propagating orthogonal to the light guide surfaces 110', 110", according to some embodiments.

According to various embodiments, the multibeam elements 120 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 120 comprising a diffraction grating is configured to diffractively couple out the guided light portion as the plurality of directional light beams 102 having the different principal angular directions. In other embodiments, the multibeam element 120 comprising a micro-reflective element is configured to reflectively couple out the guided light portion as the plurality of directional light beams 102, or the multibeam element 120 comprising a micro-refractive element is configured to couple out the guided light portion as the plurality of directional light beams 102 by or using refraction (i.e., refractively couple out the guided light portion).

Figure 6A:
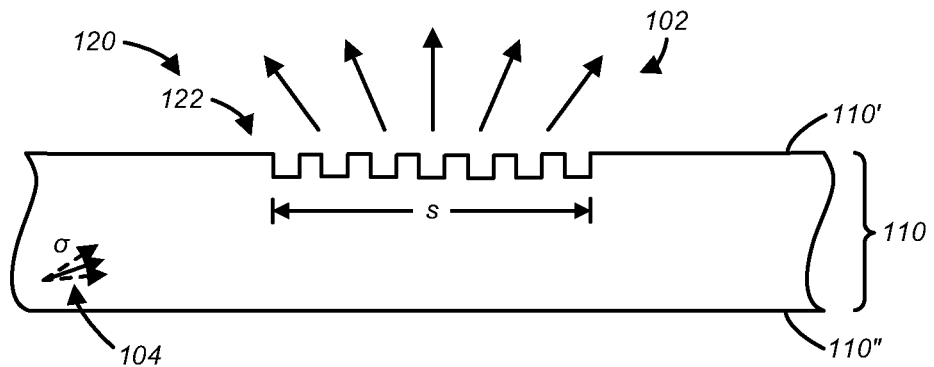
FIG. 6A illustrates a cross-sectional view of a multibeam element in an example, according to an embodiment consistent with the principles described herein.
Figure 6B:
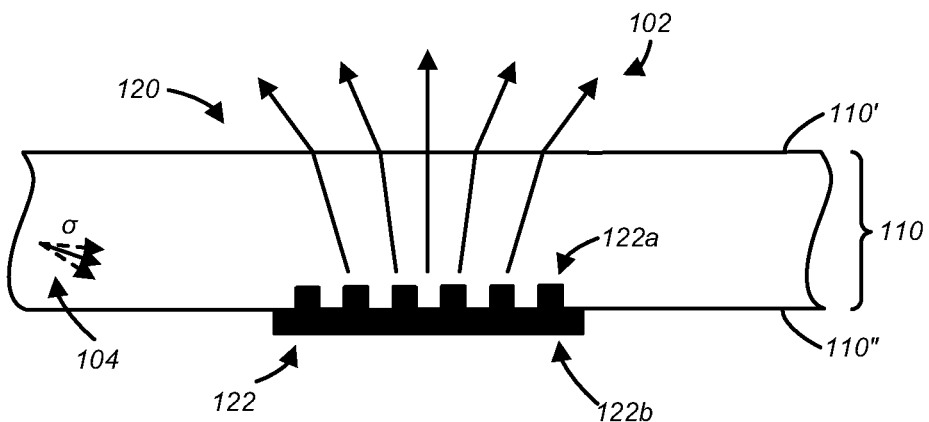
FIG. 6B illustrates a cross-sectional view of a multibeam element in another example, according to an embodiment consistent with the principles described herein.

FIG. 6A illustrates a cross-sectional view of a multibeam element 120 in an example, according to an embodiment consistent with the principles described herein. FIG. 6B illustrates a cross-sectional view of a multibeam element 120 in another example, according to another embodiment consistent with the principles described herein. In particular, FIGS. 6A-6B illustrate the multibeam element 120 of the multiview display 100 comprising a diffraction grating 122. The diffraction grating 122 is configured to diffractively couple or scatter out a portion of the guided light 104 (which may be white light or RGB) as the plurality of directional light beams 102. Note that the diffraction grating 122 comprises a plurality of diffractive features spaced apart from one another by a diffractive feature spacing (which is sometimes referred to as a 'grating spacing') or a diffractive feature or grating pitch configured to provide diffractive coupling out of the guided light portion. According to various embodiments, the spacing or grating pitch of the diffractive features in the diffraction grating 122 may be sub-wavelength (i.e., less than a wavelength of the guided light). Note that, while FIGS. 6A-6B illustrate the diffraction grating 122 having a single grating spacing (i.e., a constant grating pitch), for simplicity of illustration. In various embodiments, the diffraction grating 122 may include a plurality of different grating spacings (e.g., two or more grating spacings) or a variable grating spacing or pitch to provide the directional light beams illustrated in FIGS. 6A-6B.

In some embodiments, the diffraction grating 122 of the multibeam element 120 may be located at or adjacent to a surface of the light guide 110. For example, the diffraction grating 122 may be at or adjacent to the first surface 110' of the light guide 110, as illustrated in FIG. 6A. The diffraction grating 122 at the first surface 110' may be a transmission mode diffraction grating configured to diffractively couple out or scatter out the guided light portion through the first surface 110' as the scattered-out plurality of directional light beams 102. In another example, as illustrated in FIG. 6B, the diffraction grating 122 may be located at or adjacent to the second surface 110" of the light guide 110. When located at the second surface 110", the diffraction grating 122 may be a reflection mode diffraction grating. As a reflection mode diffraction grating, the diffraction grating 122 is configured to both diffract the guided light portion and reflect the diffracted guided light portion toward the first surface 110' to exit through the first surface 110' as the diffractively scattered-out plurality of directional light beams 102.

In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the plurality of directional light beams 102 may include an effect of refraction due to the plurality of directional light beams 102 exiting the light guide 110 at a light guide surface. For example, FIG. 6B illustrates refraction (i.e., bending) of the scattered-out plurality of directional light beams 102 due to a change in refractive index as the scattered-out plurality of directional light beams 102 cross the first surface 110', by way of example and not limitation.

According to some embodiments, the diffractive features of the diffraction grating 122 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110. When the multibeam elements 120 are located on a backside or second surface 110" of the light guide 110 and comprise a plurality of diffraction grating 122 configured as reflection mode diffraction gratings (e.g., as illustrated in FIG. 6B), individual diffraction gratings of the grating plurality are formed into the second surface 110" by etching and reflection may be enhanced using a reflective layer comprising silver that is applied to the second surface 110" of the light guide 110 to cover the diffraction gratings and substantially fill diffractive features (e.g., grooves) thereof. In particular, as illustrated in FIG. 6B, the diffraction grating 122 may comprise a diffraction grating 122a and a reflective layer 122b. The reflective layer 122b may comprise a reflective material or layer such as, but not limited to a reflective metal layer. Note that grating characteristics (such as grating pitch, groove depth, ridge height, etc.) and/or a density of diffraction gratings may be used to compensate for a change in optical intensity of the guided light 104 within the light guide 110 as a function of propagation distance, according to some embodiments.

In some embodiments, the diffraction grating 122 of the multibeam element 120 is a uniform diffraction grating in which the diffractive feature spacing is substantially constant or unvarying throughout the diffraction grating 122. In some embodiments (not illustrated), the diffraction grating 122 configured to provide the directional light beams 102 is or comprises a variable or chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 120 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

While the preceding discussion illustrated the multibeam elements 120 as diffraction gratings, in other embodiments a wide variety of optical components are used to generate the directional light beams 102, including micro-reflective components and/or micro-refractive components. For example, the micro-reflective components may include a triangular-shaped mirror, a trapezoid-shaped mirror, a pyramid-shaped mirror, a rectangular-shaped mirror, a hemispherical-shaped mirror, a concave mirror and/or a convex mirror. Note that these optical components may be located at the first surface 110' and/or the second surface 110" of the light guide 110. Moreover, an optical component may be disposed on the first surface 110', the second surface 110" or between the first surface 110' and the second surface 110". Furthermore, an optical component may be a 'positive feature' that protrudes out from the first surface 110' and/or the second surface 110", or it may be a 'negative feature' that is recessed into the first surface 110' and/or the second surface 110".

Figure 6C:
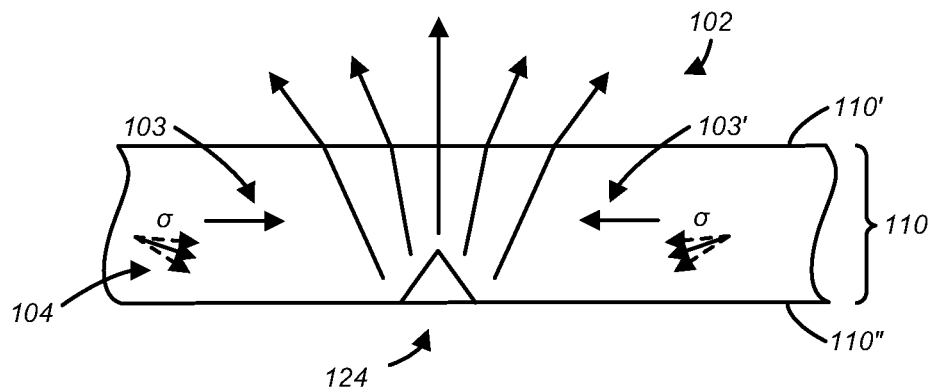
FIG. 6C illustrates a cross-sectional view of a multibeam element in an example, according to another embodiment consistent with the principles described herein.

FIG. 6C illustrates a cross-sectional view of a multibeam element 120 in an example, according to another embodiment consistent with the principles described herein. In particular, FIG. 6C illustrates various embodiments of the multibeam element 120 comprising a micro-reflective element 124. Micro-reflective elements used as or in the multibeam element 120 may include, but are not limited to, a reflector that employs a reflective material or layer thereof (e.g., a reflective metal) or a reflector based on total internal reflection (TIR). According to some embodiments (e.g., as illustrated in FIG. 6C), the multibeam element 120 comprising the micro-reflective element 124 may be located at or adjacent to a surface (e.g., the second surface 110") of the light guide 110. In other embodiments (not illustrated), the micro-reflective element 124 may be located within the light guide 110 between the first and second surfaces 110', 110".

For example, FIG. 6C illustrates the multibeam element 120 comprising a micro-reflective element 124 having reflective a facet (e.g., a 'prismatic' micro-reflective element) located adjacent to the second surface 110" of the light guide 110. The facets of the illustrated prismatic micro-reflective element 124 are configured to reflect (i.e., reflectively couple) the portion of the guided light 104 out of the light guide 110. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 6C) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments. FIG. 6C also illustrates the guided light 104 having two propagation directions 103, 103' (i.e., illustrated as bold arrows), by way of example and not limitation. Using two propagation directions 103, 103' may facilitate providing the plurality of directional light beams 102 with symmetrical principal angular directions, for example. In another example (not shown), the micro-reflective element may have a substantially smooth, curved surface such as, but not limited to, a semi-spherical micro-reflective element 124.

Figure 6D:
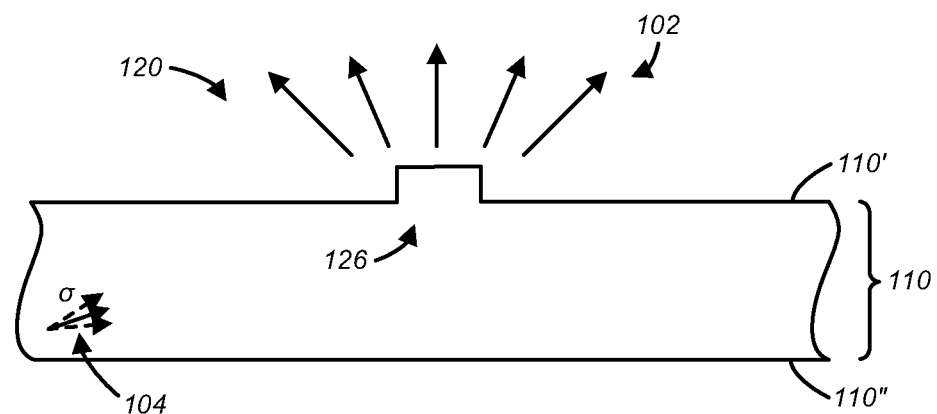
FIG. 6D illustrates a cross-sectional view of a multibeam element in yet another example, according to another embodiment consistent with the principles described herein.

FIG. 6D illustrates a cross-sectional view of a multibeam element 120, in an example, according to another embodiment consistent with the principles described herein. In particular, FIG. 6D illustrates a multibeam element 120 comprising a micro-refractive element 126. According to various embodiments, the micro-refractive element 126 is configured to refractively couple out a portion of the guided light 104 from the light guide 110. That is, the micro-refractive element 126 is configured to employ refraction (e.g., as opposed to diffraction or reflection) to couple out the guided light portion from the light guide 110 as the directional light beams 102, as illustrated in FIG. 6D. The micro-refractive element 126 may have various shapes including, but not limited to, a semi-spherical shape, a rectangular shape or a prismatic shape (i.e., a shape having sloped facets). According to various embodiments, the micro-refractive element 126 may extend or protrude out of a surface (e.g., the first surface 110') of the light guide 110, as illustrated, or may be a cavity in the surface (not illustrated). Further, the micro-refractive element 126 may comprise a material of the light guide 110, in some embodiments. In other embodiments, the micro-refractive element 126 may comprise another material adjacent to, and in some examples, in contact with the light guide surface.

In accordance with some embodiments of the principles described herein, a multiview display is provided. The multiview display is configured to emit modulated light beams as pixels of the multiview display. The emitted, modulated light beams have different principal angular directions from one another (also referred to as 'differently directed light beams' herein). Further, the emitted, modulated light beams may be preferentially directed toward a plurality of viewing directions of the multiview display. In non-limiting examples, the multiview display may include four-by-four (4×4), four-by-eight (4×8) or eight-by-eight (8×8) views with a corresponding number of view directions. In some examples, the multiview display is configured to provide or 'display' a multiview image. Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example.

Further, according to various embodiments, the multiview display comprises a plurality of multiview pixels that have a dynamically reconfigurable shape. In particular, a multiview pixel of the multiview pixel plurality comprises a set of light valves configured to modulate the directional light beams to provide the multiview image. Additionally, the multiview pixels of the multiview pixel plurality have individual shapes that are dynamically reconfigurable to provide the multiview image having a dynamic FOV based on a condition of the multiview display, according to various embodiments.

Figure 7:
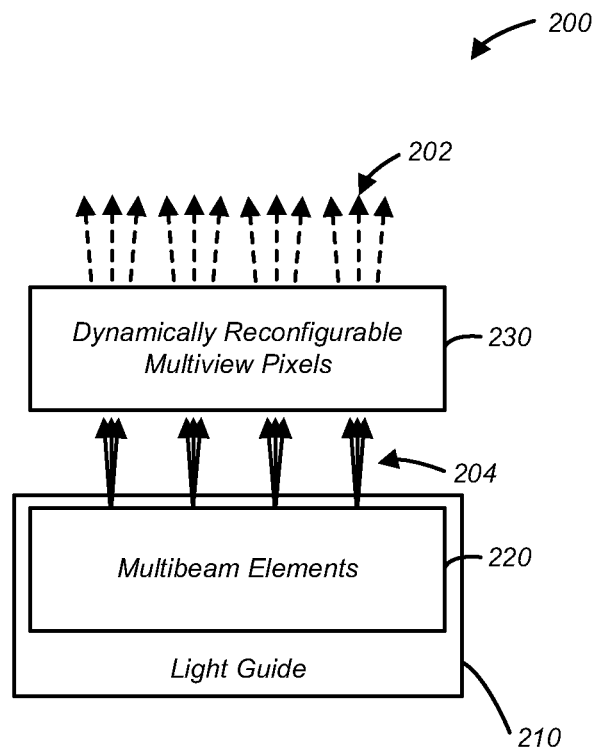
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the illustrated multiview display 200 is configured to provide or display a multiview image having different views in different view directions. In particular, modulated light beams 202 emitted by the multiview display 200 may be used to display the multiview image and may correspond to pixels of the different views (i.e., view pixels). The modulated light beams 202 are illustrated as arrows emanating from the multiview display 200 in FIG. 7. Dashed lines are used for the arrows of the emitted modulated light beams 202 to emphasize the modulation thereof by way of example and not limitation.

The multiview display 200 illustrated in FIG. 7 comprises an array of dynamically reconfigurable multiview pixels 230. The dynamically reconfigurable multiview pixels 230 of the array are configured to provide a plurality of different views of the multiview display 200. According to various embodiments, a dynamically reconfigurable multiview pixel 230 of the array comprises a plurality of sub-pixels configured to modulate a plurality of light beams 204 and to produce the emitted modulated light beams 202. In some embodiments, the dynamically reconfigurable multiview pixel 230 of the array is substantially similar to the multiview pixel 106 that comprises the set of sub-pixels, described above with respect to the multiview display 100. Further, in some embodiments, the dynamically reconfigurable multiview pixel 230 is substantially similar to a set of light valves 130 of the array of light valves 130, described above with respect to the multiview display 100. In particular, a sub-pixel of the dynamically reconfigurable multiview pixel 230 may comprise a light valve that is substantially similar to the above-described light valve 130. That is, a dynamically reconfigurable multiview pixel 230 of the multiview display 200 may comprises a set of light valves (e.g., a set of light valves 130), and a sub-pixel of the dynamically reconfigurable multiview pixel 230 may comprise a light valve (e.g., a single light valve 130) of the set, according to various embodiments.

As illustrated in FIG. 7, the multiview display 200 further comprises a light guide 210. The light guide 210 is configured to guide light. The light may be guided, e.g., as a guided light beam, according to total internal reflection, in various embodiments. For example, the light guide 210 may be a plate light guide configured to guide light from a light-input edge thereof as a guided light beam. In some embodiments, the light guide 210 of the multiview display 200 may be substantially similar to the light guide 110 described above with respect to the multiview display 100.

According to various embodiments, the multiview display 200 illustrated in FIG. 7 further comprises an array of multibeam elements 220. Each multibeam element 220 of the array is configured to provide the plurality of light beams 204 to a corresponding dynamically reconfigurable multiview pixel 230. In particular, the multibeam elements are configured to couple out or scatter out a portion of the guided light from the light guide as the plurality of light beams 204. The light beams 204 of the light beam plurality have different principal angular directions from one another. Further, the different principal angular directions of the light beams 204 correspond to different view directions of respective ones of the different views of the multiview display 200, according to various embodiments.

According to various embodiments, a size of a multibeam element 220 of the multibeam element array is comparable to a size of a sub-pixel of the sub-pixel plurality in the dynamically reconfigurable multiview pixel 230. For example, the size of the multibeam element 220 may be greater than one half of the sub-pixel size and less than twice the sub-pixel size, in some embodiments. In addition, an inter-element distance between multibeam elements 220 of the multibeam element array may correspond to an inter-pixel distance between dynamically reconfigurable multiview pixels 230 of the multiview pixel array, according to some embodiments. Further, there may be a one-to-one correspondence between the dynamically reconfigurable multiview pixels 230 of the multiview pixel array and the multibeam elements 220 of the multibeam element array. In particular, in some embodiments, the inter-element distance (e.g., center-to-center) between the multibeam elements 220 may be substantially equal to the inter-pixel distance (e.g., center-to-center) between the dynamically reconfigurable multiview pixels 230. As such, each sub-pixel in the dynamically reconfigurable multiview pixel 230 may be configured to modulate a different one of the light beams 204 of the plurality of light beams 204 provided by a corresponding multibeam element 220. Further, each dynamically reconfigurable multiview pixel 230 may be configured to receive and modulate the light beams 204 from one and only one multibeam element 220, according to some embodiments.

In some embodiments, the multibeam element 220 of the multibeam element array may be substantially similar to the multibeam element 120 of the multiview display 100, described above. For example, the multibeam element 220 may comprise a plurality of diffraction gratings substantially similar to the plurality of diffraction gratings 122, described above. In particular, the multibeam elements 220 may be optically coupled to the light guide 210 and configured to couple out or scatter out a portion of the guided light from the light guide as the plurality of light beams 204 provided to the corresponding dynamically reconfigurable multiview pixels 230 of the multiview pixel array, according to various embodiments.

Moreover, in some embodiments, a shape of the dynamically reconfigurable multiview pixel 230 in the multiview display may be dynamically reconfigurable to provide the multiview image having a dynamic FOV. For example, the shape of the dynamically reconfigurable multiview pixel 230 may be substantially similar to shapes 132, described above. In some embodiments, the FOV may be modified based on a monitored orientation of the multiview display, a monitored position of a user relative to the multiview display, or both. Alternatively or additionally, the FOV may be modified based on content that is displayed or that is to be displayed on the multiview display.

In some of these embodiments (not illustrated in FIG. 7), the multiview display 200 may further comprise a light source. The light source may be configured to provide the light to the light guide 210 with a non-zero propagation angle and, in some embodiments, is collimated according to a collimation factor to provide a predetermined angular spread of the guided light within the light guide 210, for example. According to some embodiments, the light source may be substantially similar to the light source 140, described above with respect to the multiview display 100. In some embodiments, a plurality of light sources may be employed. For example, a pair of light sources may be used at two different edges or ends (e.g., opposite ends) of the light guide 210 to provide the light to the light guide 210. In some embodiments, the multiview display 200 comprises the multiview display 100.

Figure 8:
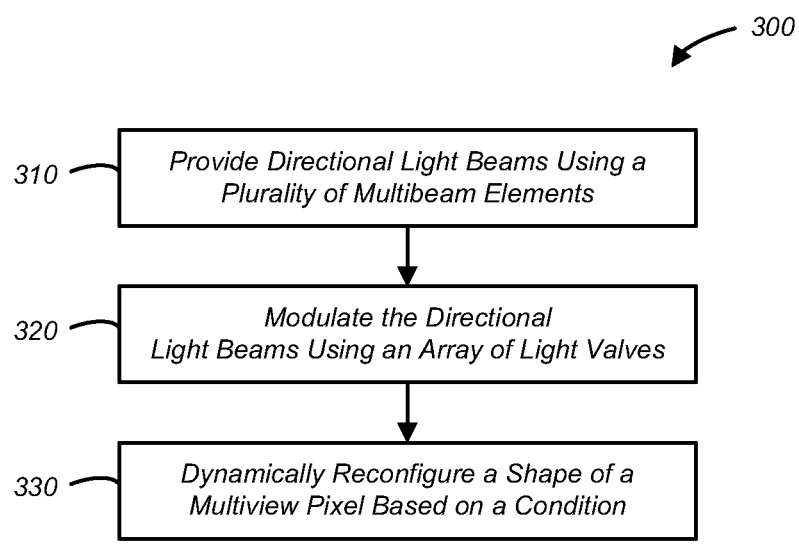
FIG. 8 illustrates a flow chart of a method of multiview display operation in an example, according to an embodiment consistent with the principles described herein.

In accordance with other embodiments of the principles described herein, a method of multiview display operation is provided. FIG. 8 illustrates a flow chart of a method 300 of multiview display operation in an example, according to an embodiment consistent with the principles described herein. As illustrated in FIG. 8, the method 300 of multiview display operation comprises providing 310 directional light beams having different principal angular directions corresponding to different view directions of a multiview image using a plurality of multibeam elements spaced apart from one another. Notably, a multibeam element of the multibeam element plurality may be configured to scatter out a portion of the guided light from a light guide as a plurality of the directional light beams. In some embodiments, the multibeam element is substantially similar to the multibeam elements 120 of the multiview display 100, described above. For example, multibeam elements 120 may comprise one or more of a diffraction grating, a micro-reflective element, or a micro-refractive element that is substantially similar to the above-described diffraction grating 122, the micro-reflective element 124, and the micro-refractive element 126 of the multiview display 100.

The method 300 of multiview display operation illustrated in FIG. 8 comprises modulating 320 the directional light beams to display the multiview image using an array of light valves. Notably, a set of light valves of the light valve array may correspond to a multibeam element of the multibeam element plurality arranged as a multiview pixel and may be configured to modulate directional light beams from the multibeam element. According to some embodiments, a light valve of an array of light valves corresponds to a sub-pixel of a multiview pixel. That is, the light valve may have a size comparable to a size of the sub-pixel or a size comparable to a center-to-center spacing between the sub-pixels of the multiview pixel, for example. According to some embodiments, the plurality of light valves may be substantially similar to the array of light valves 130 described above with respect to FIGS. 3A-3C for the multiview display 100. In particular, different sets of light valves may correspond to different multiview pixels in a manner similar to the correspondence of the first and second light valve sets 130a, 130b to different multiview pixels 106, as described above. Further, individual light valves of the light valve array may correspond to sub-pixels of the multiview pixels as the above-described light valve 130 corresponds to the sub-pixel in the above-reference discussion of FIGS. 3A-3C.

As illustrated in FIG. 8, the method 300 of multiview display operation further comprises dynamically reconfiguring 330 a shape of a multiview pixel according to a condition of the multiview display to provide the multiview image having a dynamic FOV based on the condition. According to various embodiments, a multiview pixel may include multiple sub-pixels. In some embodiments, the shape of the multiview pixel is substantially similar to one of the shapes 132, described above. For example, dynamically reconfiguring the multiview pixel shape may comprise switching between a first rectangular shape having a width that is greater than a length and second rectangular shape having a width that is less than length. The first rectangular shape may provide a greater number of views in a horizontal direction and the second rectangular shape may provide a greater number of views in a vertical direction. Note that the multiview pixel shape may be tileable on the light valve array.

In some embodiments (not illustrated), the method 300 of multiview display operation comprises one or both of monitoring an orientation of the multiview display and monitoring a position of a user relative to the multiview display to provide the multiview display condition, where dynamically reconfiguring the multiview pixel shape employs one or both of the monitored orientation and the monitored user position to determine the dynamic FOV of the multiview image. Alternatively or additionally, the multiview display condition may be determined by a content of the multiview image being displayed on the multiview display.

In some embodiments (not illustrated), the method of multiview display operation further comprises providing light to the light guide using a light source. The provided light one or both of may have a non-zero propagation angle within the light guide. Further, the guided light may be collimated, e.g., collimated according to a predetermined collimation factor. According to some embodiments, the light guide may be substantially similar to the light guide 110 described above with respect to the multiview display 100. In particular, the light may be guided according to total internal reflection within the light guide, according to various embodiments.

In some embodiments (not illustrated) the method of multiview display operation further comprises guiding light along a light guide as guided light. In some embodiments, the light may be guided at a non-zero propagation angle. Further, the guided light may be collimated, e.g., collimated according to a predetermined collimation factor. According to some embodiments, the light guide may be substantially similar to the light guide 110 described above with respect to the multiview display 100. In particular, the light may be guided according to total internal reflection within the light guide, according to various embodiments.

Thus, there have been described examples and embodiments of a multiview display, a method of multiview display operation, and a multiview display that employ dynamically reconfigurable multiview pixels to provide the multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
    a plurality of multibeam elements spaced apart from one another and configured to provide directional light beams having different principal angular directions corresponding to different view directions of the multiview display; and
    an array of light valves configured to modulate the directional light beams as a multiview image to be displayed by the multiview display,
    the array of light valves being tiled into mutually exclusive sets with a tiling that is dynamically reconfigurable to provide the multiview image having a dynamic field of view (FOV),
    each light valve of each set of light valves being located to modulate a single directional light beam from a corresponding single multibeam element of the plurality of multibeam elements.

2. The multiview display of claim 1, further comprising a light guide configured to guide light in a propagation direction along the light guide as guided light, a multibeam element of the multibeam element plurality being configured to scatter out a portion of the guided light as a plurality of the directional light beams, wherein a size of the multibeam element is comparable to a size of a light valve in the light valve array.

3. The multiview display of claim 2, wherein the multibeam element comprising one or more of a diffraction grating, a micro-reflective element, and a micro-refractive element configured to scatter out the guided light portion.

4. The multiview display of claim 2, further comprising a light source optically coupled to an input of the light guide, the light source being configured to provide the light to the light guide, the guided light one or both of having a non-zero propagation angle and being collimated according to a predetermined collimation factor.

5. The multiview display of claim 1, wherein each set of the mutually exclusive sets has a shape that comprises one of a diamond, a square, a horizontal rectangle, a vertical rectangle, or a step-wise shape.

6. The multiview display of claim 5, wherein the multiview display is configured to monitor a position of a user relative to the multiview display, the shape being dynamically reconfigurable based on the monitored position.

7. The multiview display of claim 1, wherein the multiview display is configured to monitor an orientation of the multiview display, the tiling of the array of light valves being dynamically reconfigured based on the monitored orientation.

8. The multiview display of claim 1, wherein the tiling of the array of light valves is dynamically reconfigured based on a content of the multiview image to be displayed by the multiview display.

9. The multiview display of claim 1, wherein the tiling of the array of light valves is dynamically reconfigurable such that each set of the mutually exclusive sets has a shape that is dynamically reconfigurable between a first rectangular shape having a width that is greater than a length and second rectangular shape having a width that is less than length, the first rectangular shape being configured to provide a greater number of views in a horizontal direction and the second rectangular shape being configured to provide a greater number of views in a vertical direction.

10. A multiview display comprising:
    a light guide configured to guide light along a length of the light guide as guided light;
    a plurality of multibeam elements configured to scatter out from the light guide a portion of the guided light as directional light beams having different principal angular directions corresponding to different view directions of the multiview display; and
    an array of light valves configured to modulate the directional light beams as a multiview image,
    the array of light valves being tiled into mutually exclusive sets with a tiling that is dynamically reconfigurable to provide the multiview image having a dynamic field of view (FOV) based on a condition of the multiview display,
    each light valve of each set of light valves being located to modulate a single directional light beam from a corresponding single multibeam element of the plurality of multibeam elements.

11. The multiview display of claim 10, wherein the multiview display is configured to one or both of monitor a position of a user relative to the multiview display and monitor an orientation of the multiview display, the tiling of the array of light valves being dynamically reconfigured based on one or both of the monitored position and orientation.

12. The multiview display of claim 10, wherein a size of the multibeam element is comparable to a size of a light valve in the sets of light valves, the multibeam element comprising one or more of a diffraction grating, a micro-reflective element, and a micro-refractive element configured to scatter out the guided light portion.

13. The multiview display of claim 10, wherein the tiling of the array of light valves is dynamically reconfigured based on a content of the multiview image to be displayed by the multiview display.

14. A method of multiview display operation, the method comprising:

providing directional light beams having different principal angular directions corresponding to different view directions of a multiview image using a plurality of multibeam elements spaced apart from one another;

modulating the directional light beams to display the multiview image using an array of light valves, the array of light valves being tiled into mutually exclusive sets with a tiling that is dynamically reconfigurable to provide the multiview image having a dynamic field of view (FOV), each light valve of each set of light valves being located to modulate a single directional light beam from a corresponding single multibeam element of the plurality of multibeam elements; and dynamically reconfiguring the tiling of the array of light valves according to a condition of the multiview display to provide the dynamic field of view (FOV) based on the condition of the multiview display.

15. The method of multiview display operation of claim 14, further comprising guiding light along a light guide as guided light, wherein a multibeam element of the multibeam element plurality being configured to scatter out a portion of the guided light from the light guide as a plurality of the directional light beams, a size of the multibeam element being comparable to a size of a light valve in the light valve array.

16. The method of multiview display operation of claim 14, further comprising one or both of monitoring an orientation of the multiview display and monitoring a position of a user relative to the multiview display to provide the multiview display condition, wherein dynamically reconfiguring the tiling of the array of light valves employs one or both of the monitored orientation and the monitored user position to determine the dynamic FOV of the multiview image.

17. The method of multiview display operation of claim 14, wherein the multiview display condition is determined by a content of the multiview image being displayed on the multiview display.

18. The method of multiview display operation of claim 14, wherein dynamically reconfiguring the tiling of the array of light valves comprises switching between a first rectangular shape having a width that is greater than a length and second rectangular shape having a width that is less than length, the first rectangular shape providing a greater number of views in a horizontal direction and the second rectangular shape providing a greater number of views in a vertical direction.

* * * * *